March 22, 1938. L. J. LARSON 2,111,791
WELDED SEAM FOR ALLOY LINERS IN VESSELS
Filed June 29, 1936
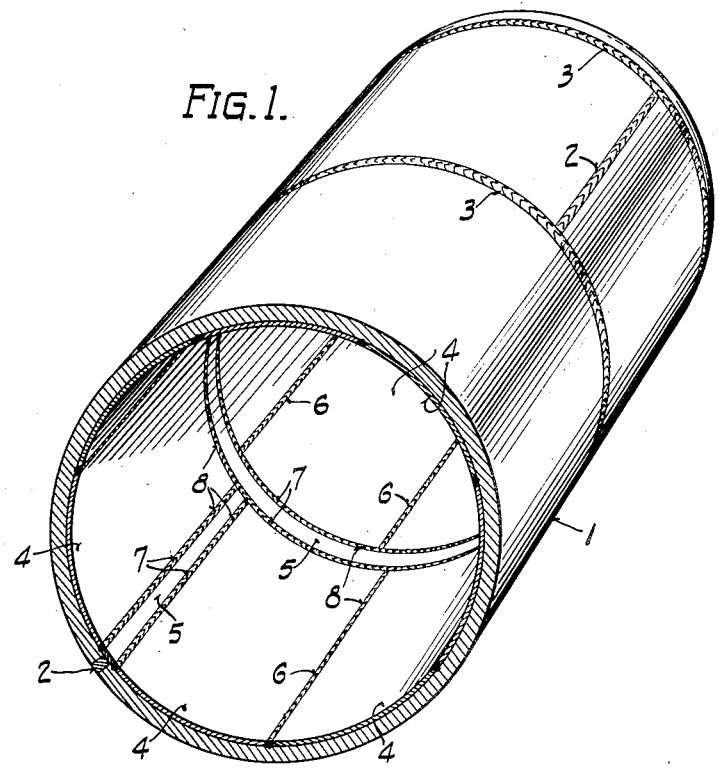
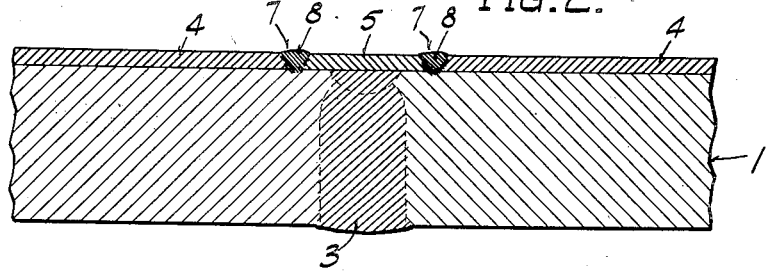
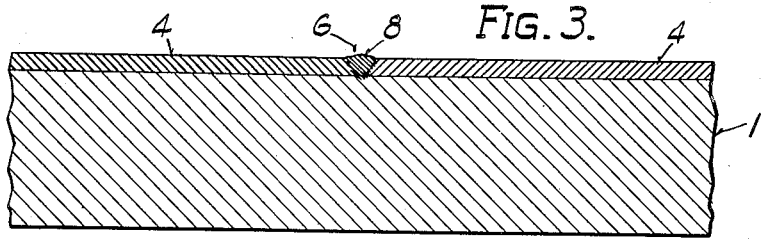
Louis J. Larson
INVENTOR.
BY
ATTORNEY.

Patented Mar. 22, 1938

2,111,791

UNITED STATES PATENT OFFICE 2,111,791

WELDED SEAM FOR ALLOY LINERS IN VESSELS

Louis J. Larson, Milwaukee, Wis., assignor to A. O. Smith Corporation, Milwaukee, Wis., a corporation of New York Application June 29, 1936, Serial No. 87,911

3 Claims. (Cl. 219—10)

This invention relates to welded seams for alloy liners in vessels such as oil cracking stills, paper digesters and chemical process vessels.

In the lining of vessels with corrosion-resistant alloy sheet lining for protecting the same from corrosion, certain difficulties have arisen in maintaining a uniform alloy content at the surface of the welded seams between the sheets of lining material. This is largely due to the dilution of the alloy deposit by fusion with the carbon steel plate beneath.

Where the edges of the alloy liner sheets are spaced apart, leaving a gap for receiving the deposited alloy weld metal, it has been necessary to employ filler material of richer alloy content than that desired in the finished deposit in order to counteract the dilution from the steel beneath. In many instances it is impossible to obtain electrode wire and filler material of the right alloy content. Furthermore, the inability of the welder to accurately control the depth of penetration of the carbon steel by the welding arc results in uncertainty as to the final alloy content of the deposit. And where the liner sheets are of a composition containing no iron, it is impossible to correct the dilution from the steel beneath.

It has been proposed to reduce the amount of deposit and to substantially prevent fusion with the carbon steel plate beneath by abutting the edges of the alloy sheet and penetrating with the electric arc just sufficiently to completely fuse the abutting edges together for their full depth. This process tends to leave a slight crack where there is a lack of penetration and the result is an extension of the crack in service to the surface of the weld.

The object of the present invention is to provide a welded seam in such an alloy lining of superior quality and having less tendency to develop cracks in service.

Another object is to provide a novel method of welding the seam in an alloy lining.

The invention is illustrated in the accompany drawing in which:

Fig. 1 is a section in perspective through a lined vessel;

Fig. 2 is a transverse section through a welded seam in the vessel; and

Fig. 3 is a similar section through an intermediate seam in the liner.

The vessel 1 is made up of carbon steel plates welded together on longitudinal seams 2 and circumferential seams 3. The vessel is lined with corrosion-resistant alloy sheets 4 which usually are of smaller dimensions than the plates from which the vessel is fabricated, requiring a plurality of additional seams in the liner. The liner sheets are preferably applied to the plates in the flat, after which the plates are shaped and butt welded together. The liner sheets have their edges spaced slightly from the main seams in the plates and the welds 2 and 3 are covered on the inside by a strip 5 of the corrosion-resistant alloy.

The seams 6 between the alloy sheets 4 and the seams 7 between the sheets 4 and strips 5 are the subject of the invention.

In carrying out the invention as illustrated in Fig. 2 the edges of the liner sheets 4 and also of the strips 5 are beveled either before or after the sheets are attached to the plates and formed. This provides a shallow groove in which the lower edges of the alloy sheets meet at the bottom. In welding this type of groove, it is possible to accurately control the penetration so as to provide a weld deposit 8, of substantially the same alloy composition as sheets 4 and strips 5, which secures the sheets and strips together and to the plate beneath, and at the same time has a minimum amount of dilution at the root of the weld.

The preferable method is the electric arc process employing a metallic electrode of special alloy to produce the desired composition of deposit. In some instances it may be desirable to make the deposit 8 in two different layers, but in general one layer will be satisfactory with thin liners since the dilution of the deposit from the carbon steel beneath is negligible with the groove and process described.

In Fig. 3 the deposit 8 is shown as joining two liner sheets 4 at a location intermediate the main vessel seams. The welded seam 6 in this case is constructed in the same manner as seam 7 illustrated in Fig. 2.

The invention may be applied to what is known as clad metal linings in which the vessel is made up of composite plates having the outer layer of carbon steel and the inner layer of special alloy, instead of to the construction illustrated in which separate alloy liner sheets are applied to the carbon steel plates of the vessel. In case composite plates are employed in fabricating the vessel, seams 6 are eliminated and the invention is employed in welding the inner alloy lining layers together or to a cover strip at the joint.

The invention is claimed as follows:

1. A composite article having a relatively thin alloy surface layer on a metal base of different composition and having a welded seam in said alloy layer comprising a deposit of alloy weld metal of substantially the same composition as said surface layer and fused with the meeting edges of said layer and with the metal base, the root of fusion at said seam being narrow and of only slight penetration in the base metal to prevent dilution of the deposit thereby.

2. A vessel having a lining of corrosion-resistant metal of different composition from that of the wall of the vessel, and having welded seams in said lining comprising a deposit of weld metal of substantially the same composition as said lining for approximately the full thickness of the lining, said deposit being fused to the base metal of the vessel wall in a very narrow line at the root of the deposit, there being substantially no dilution of the deposit by the base metal.

3. The method of welding seams in alloy liners of vessels comprising providing a shallow groove between the edges of the alloy material with the bottom edges meeting, depositing alloy weld metal with an electric arc to fill said groove and obtaining during said depositing operation only a slight penetration of the base metal beneath said liner to prevent substantial dilution of the alloy at the seam.

LOUIS J. LARSON.